United States Patent
Harada et al.

(10) Patent No.: US 10,490,813 B2
(45) Date of Patent: *Nov. 26, 2019

(54) BATTERY ACTIVE MATERIAL, NONAQUEOUS ELECTROLYTE BATTERY AND BATTERY PACK

(71) Applicant: KABUSHIKI KAISHA TOSHIBA, Tokyo (JP)

(72) Inventors: Yasuhiro Harada, Yokohama (JP); Norio Takami, Yokohama (JP); Hiroki Inagaki, Kawasaki (JP); Yorikazu Yoshida, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 373 days.

This patent is subject to a terminal disclaimer.

(21) Appl. No.: 15/341,667

(22) Filed: Nov. 2, 2016

(65) Prior Publication Data

US 2017/0077512 A1     Mar. 16, 2017

Related U.S. Application Data

(63) Continuation of application No. 13/281,968, filed on Oct. 26, 2011, now Pat. No. 9,515,319.

(30) Foreign Application Priority Data

Oct. 29, 2010   (JP) ................. 2010-244658

(51) Int. Cl.
*H01M 4/485*     (2010.01)
*C01G 23/00*     (2006.01)
(Continued)

(52) U.S. Cl.
CPC .......... *H01M 4/485* (2013.01); *C01G 23/002* (2013.01); *C01G 33/006* (2013.01);
(Continued)

(58) Field of Classification Search
None
See application file for complete search history.

(56) References Cited

U.S. PATENT DOCUMENTS

RE34,991 E    7/1995   Yoshino et al.
2003/0053945 A1   3/2003   Fukuoka et al.
(Continued)

FOREIGN PATENT DOCUMENTS

CN      1407641      4/2003
CN     101154729      4/2008
(Continued)

OTHER PUBLICATIONS

Madeleine Gasperin, "Affinement de la structure de $TiNb_2O_7$ et répartition des cations", Journal of Solid State Chemistry 53, 1984, pp. 144-147.
(Continued)

*Primary Examiner* — Wojciech Haske
(74) *Attorney, Agent, or Firm* — Oblon, McClelland, Maier & Neustadt, L.L.P.

(57) ABSTRACT

According to one embodiment, a battery active material is provided. The battery active material includes monoclinic complex oxide represented by the formula $Li_xTi_{1-y}M1_yNb_{2-z}M2_zO_{7+\delta}$ ($0 \leq x \leq 5$, $0 \leq y \leq 1$, $0 \leq z \leq 2$, $-0.3 \leq \delta \leq 0.3$). In the above formula, M1 is at least one element selected from the group consisting of Zr, Si and Sn, and M2 is at least one element selected from the group consisting of V, Ta and Bi.

19 Claims, 7 Drawing Sheets

(51) Int. Cl.
*C01G 33/00* (2006.01)
*H01M 10/0525* (2010.01)
*H01M 4/131* (2010.01)
*H01M 4/02* (2006.01)

(52) U.S. Cl.
CPC ..... *H01M 10/0525* (2013.01); *C01P 2002/52* (2013.01); *C01P 2002/72* (2013.01); *C01P 2002/77* (2013.01); *C01P 2006/40* (2013.01); *H01M 4/131* (2013.01); *H01M 2004/021* (2013.01); *Y02E 60/122* (2013.01)

(56) References Cited

U.S. PATENT DOCUMENTS

| | | |
|---|---|---|
| 2008/0073594 A1 | 4/2008 | Harada et al. |
| 2009/0081551 A1 | 3/2009 | Hoshina et al. |
| 2012/0052401 A1 | 3/2012 | Goodenough et al. |

FOREIGN PATENT DOCUMENTS

| | | |
|---|---|---|
| CN | 101648147 | 2/2010 |
| EP | 0 205 856 B1 | 7/1991 |
| JP | 58-220361 | 12/1983 |
| JP | 2001-273936 | 10/2001 |
| JP | 2002-260599 | 9/2002 |
| JP | 2003-282161 | 10/2003 |
| JP | 2003-282162 | 10/2003 |
| JP | 2005-135775 A | 5/2005 |
| JP | 2006-40826 | 2/2006 |
| JP | 2008-91079 | 4/2008 |
| JP | 2008-511528 | 4/2008 |
| JP | 2009-21102 | 1/2009 |
| JP | 2009-81049 A | 4/2009 |
| JP | 2010-80188 | 4/2010 |
| JP | 2000-277116 | 10/2010 |
| JP | 2010-225302 | 10/2010 |
| JP | 2010-287496 | 12/2010 |
| JP | JP2011-173761 | 9/2011 |
| JP | 2013-535737 | 9/2013 |
| WO | WO 2010/052950 | 5/2010 |
| WO | WO 2012/016185 A2 | 2/2012 |

OTHER PUBLICATIONS

C. M. Reich, et al., "Niobia Based Rutile Materials as SOFC Anodes", Fuel Cells No. 3-4, 1, 2001, pp. 249-255.

I. Belharouak, et al., "$Li_2MTi_{14}$ (M=Sr, Ba): new anodes for lithium-ion batteries", Elsevier, Electrochemistry Communications 5, 2003, pp. 435-438.

Extended European Search Report dated Jan. 20, 2012 in patent application No. 11187075.4.

Office Action dated Nov. 27, 2012 in Japanese Application No. 2010-244658(With English Translation).

R.J. Cava, et al., "Lithium Insertion in Wadsley-Roth Phases Based on Niobium Oxide", Journal of the Electrochemical Society, vol. 130, No. 12, Dec. 1, 1983, XP001285518, pp. 2345-2351.

J.-F. Colin, et al., "Lithium Insertion in an Oriented Nanoporous Oxide with a Tunnel Structure: $Ti_2Nb_2O_9$", Chemistry of Materials, vol. 20, No. 4, Feb. 1, 2008, XP55016276, pp. 1534-1540.

Office Action dated Jan. 6, 2015 in Japanese Patent Application No. 2014-094165 (with English language translation).

Extended European Search Report dated Dec. 4, 2013 in Patent Application No. 13191910.2.

John B. Goodenough, "Batt Task 2 Anodes" First-quarter FY 2010 report for the Batteries for Advanced Transportation Technologies (BATT) Program, XP055090141, Feb. 26, 2010, pp. 1-62.

Office Action dated Mar. 4, 2014 in Japanese Patent Application No. 2013-055381 (with English language translation).

Combined Chinese Office Action and Search Report dated Nov. 21, 2013 in Patent Application No. 20110336136.6 (with English language translation).

A.D. Wadsley, "Mixed Oxides of Titanium and Niobium 1" Acta Crystallographic, vol. 14, Dec. 31, 1961, pp. 660-664.

Chinese Office Action in corresponding application No. 201110336136.6, dated Sep. 2, 2014. (w/English Translation).

R.J. Cava, et al., "Dielectric properties of $TiO_2$—$Nb_2O_5$ crystallographic shear structures", Journal of materials Research, vol. 11, No. 6, Jun. 1996, pp. 1428-1432.

L. Ming, et al., "Lithium titanate having spinel structure and the application of the same to lithium ion batteries", New Material Industry, No. 3, 2009, pp. 15-18.

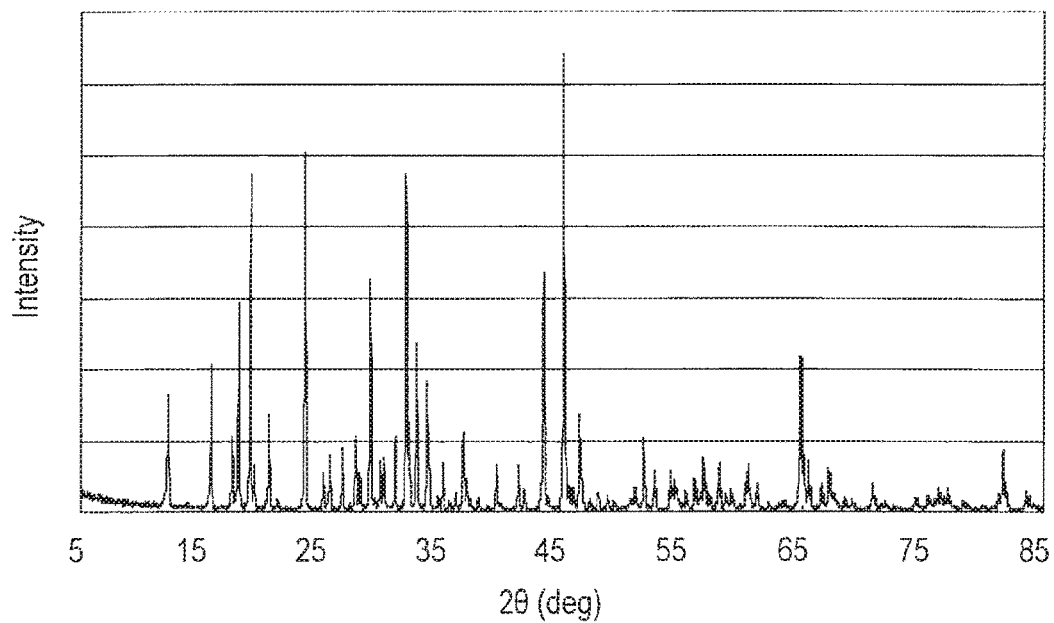
F I G. 11
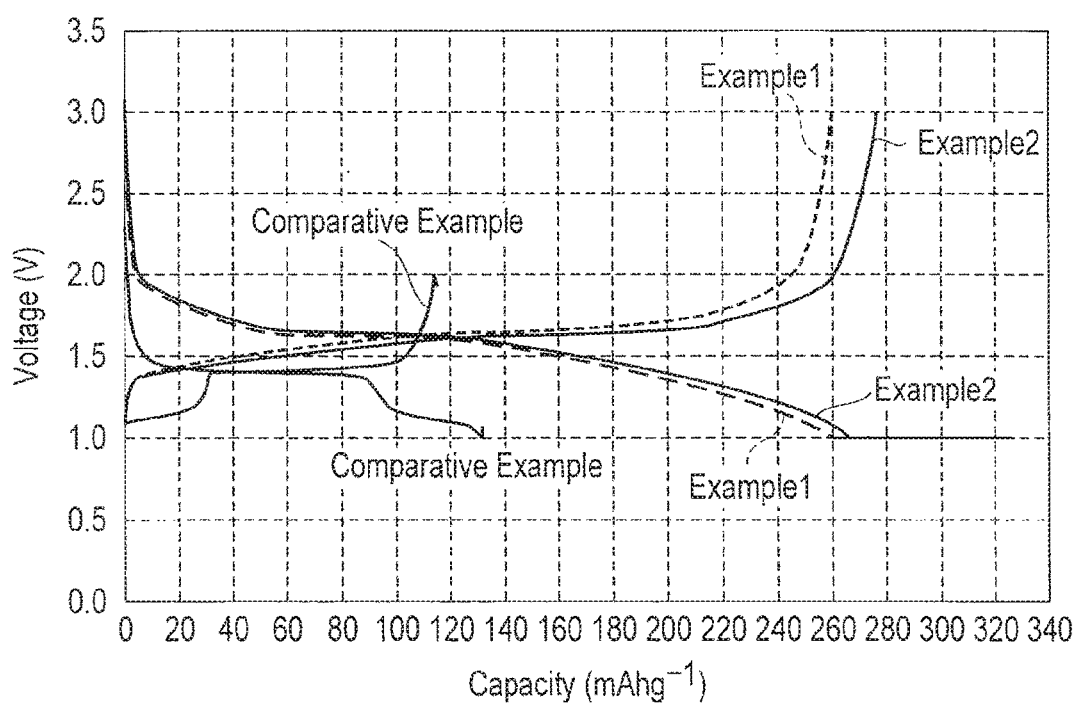
F I G. 12

BATTERY ACTIVE MATERIAL, NONAQUEOUS ELECTROLYTE BATTERY AND BATTERY PACK

CROSS-REFERENCE TO RELATED APPLICATIONS

This application is based upon and claims the benefit of priority from prior Japanese Patent Application No. 2010-244658, filed Oct. 29, 2010, the entire contents of which are incorporated herein by reference.

FIELD

Embodiments described herein relate generally to a battery active material, a nonaqueous electrolyte battery using the active material and a battery pack.

BACKGROUND

A nonaqueous electrolyte secondary battery using lithium ions has been recently developed. Such a nonaqueous electrolyte secondary battery has a high energy density and is expected to be used as a power source for hybrid vehicles, electric cars, an uninterruptible power supply for base stations for portable telephone, and the like. For this, the nonaqueous electrolyte secondary battery is desired to have other performances such as rapid charge/discharge performances and long-term reliability. For example, a nonaqueous electrolyte battery enabling rapid charge/discharge not only remarkably shortens the charging time but also makes it possible to improve performances of the motive force of a hybrid vehicle and the like and to efficiently recover the regenerative energy of them.

In order to enable rapid charge/discharge, it is necessary that electrons and lithium ions can migrate rapidly between the positive electrode and the negative electrode. When a battery using a carbon based material in the negative electrode repeats rapid charge/discharge, dendrite precipitation of metal lithium is occurred on the electrode, raising the fear as to heat generation and fires caused by internal short circuits.

In light of this, a battery using a metal composite oxide in place of a carbonaceous material in the negative electrode has been developed. Particularly, in a battery using a titanium based oxide as the negative electrode active material, rapid charge/discharge can be performed stably. Such a battery also has a longer life than those using a carbonaceous material.

However, titanium based oxide has a higher potential than carbonaceous material relative to metal lithium. Further, titanium based oxide has a lower capacity per mass. Thus a battery using titanium based oxide as the negative electrode active material has a problem that the energy density is lower.

The potential of the electrode using titanium based oxide is about 1.5 V based on metal lithium and is nobler than that of the electrode using carbonaceous material. The potential of titanium based oxide is due to the redox reaction between $Ti^{3+}$ and $Ti^{4+}$ when lithium is electrochemically inserted and released and is therefore limited electrochemically. Further, there is the fact that the inserted and released of lithium ions by rapid charge/discharge is possible at an electrode potential as high as about 1.5 V. It is therefore substantially difficult to drop the potential of the electrode to improve energy density.

As to the capacity of the battery per unit mass, the theoretical capacity of titanium dioxide having an anatase structure is about 165 mAh/g and the theoretical capacity of a lithium-titanium composite oxide such as $Li_4Ti_5O_{12}$ is also about 170 mAh/g. On the other hand, the theoretical capacity of a general graphite type electrode material is 385 mAh/g or more. Therefore, the capacity density of titanium based oxide is significantly lower than that of the carbon type material. This is due to a reduction in substantial capacity because there are only a small number of equivalent lithium-absorbing sites in the crystal structure and lithium tends to be stabilized in the structure.

BRIEF DESCRIPTION OF THE DRAWINGS

FIG. 11 is a XRD pattern for a complex oxide synthesized in Comparative Example; and FIG. 12 shows a first charge/discharge curves each of measuring cells equipped with electrode according to Examples 1 and 2 and Comparative Example, respectively.

DETAILED DESCRIPTION

In general, according to one embodiment, there is provided a battery active material comprising a monoclinic complex oxide represented by the formula $Li_xTi_{1-y}M1_yNb_{2-z}M2_zO_{7+\delta}$ ($0 \leq x \leq 5$, $0 \leq y \leq 1$, $0 \leq z \leq 2$, $-0.3 \leq \delta \leq 0.3$). In the formula, M1 is at least one element selected from the group consisting of Zr, Si and Sn, and M2 is at least one element selected from the group consisting of V, Ta and Bi.

According to another embodiment, there is provided a nonaqueous electrolyte battery comprising a negative electrode which comprises the above battery active material, a positive electrode and a nonaqueous electrolyte.

According to a further embodiment, there is provided a battery pack comprising the above nonaqueous electrolyte battery.

First Embodiment

A battery active material according to a first embodiment may be used, for example, in a nonaqueous electrolyte secondary battery. The active material comprises a monoclinic complex oxide represented by the formula $Li_xTi_{1-y}M1_yNb_{2-z}M2_zO_{7+\delta}$ ($0 \leq x \leq 5$, $0 \leq y \leq 1$, $0 \leq z \leq 2$, $-0.3 \leq \delta \leq 0.3$). The above M1 is at least one element selected from the group consisting of Zr, Si and Sn and the above M2 is at least one element selected from the group consisting of V, Ta and Bi.

Such a monoclinic complex oxide has a lithium absorption potential of about 1.5 V (vs. Li/Li$^+$) and therefore enables rapid charge/discharge to be repeated stably.

Examples of the monoclinic complex oxide represented by the formula $Li_xTi_{1-y}M1_yNb_{2-z}M2_zO_{7+\delta}$ include monoclinic $TiNb_2O_7$. A typical view of its crystal structure is shown in FIG. 1 and FIG. 2.

Figure 1:
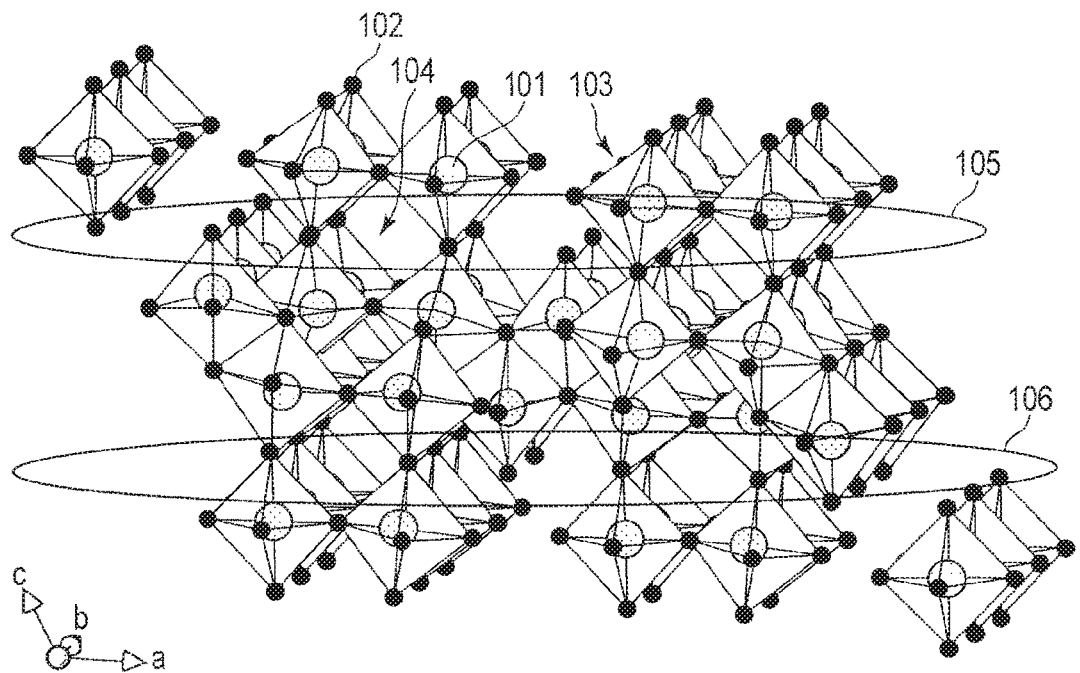
FIG. 1 is a typical view showing the crystal structure of a monoclinic $TiNb_2O_7$.
Figure 2:
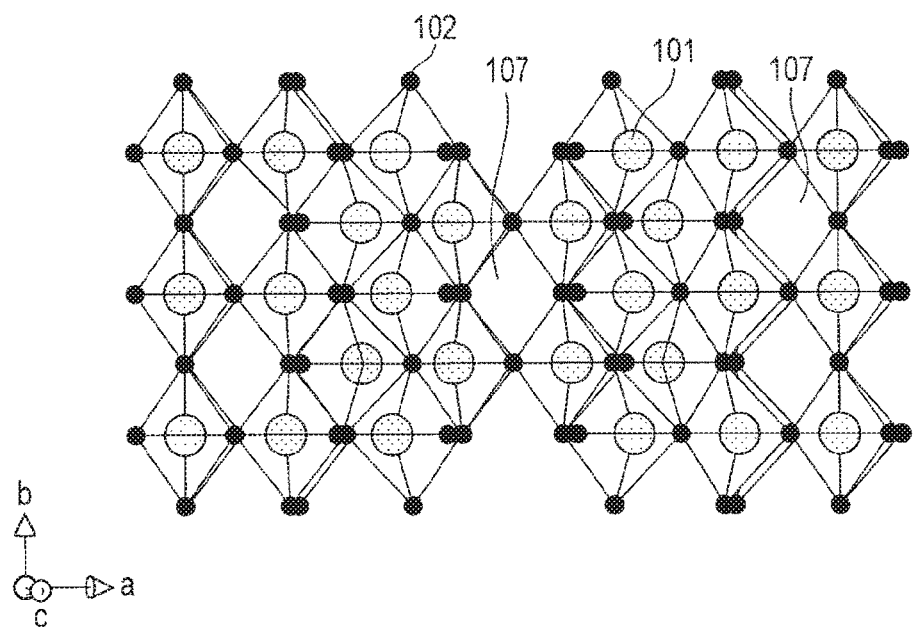
FIG. 2 is a typical view of the crystal structure of FIG. 1 as viewed from another direction.

In the crystal structure of monoclinic $TiNb_2O_7$, as shown in FIG. 1, a metal ion 101 and an oxide ion 102 constitute a skeleton structure 103. As the metal ion 101, an Nb ion and a Ti ion are arranged at random in a ratio of Nb:Ti=2:1. The skeleton structures 103 are arranged three-dimensionally alternately and a void 104 exists between the skeleton structures 103. This void 104 is able to serve as a host in which lithium ions are inserted.

In areas 105 and 106, Lithium ion can move in two directions, that is, a [100] direction and a [010] direction. Thus those areas function as a two-dimensional channel for lithium ion. In the crystal structure of monoclinic $TiNb_2O_7$, as shown in FIG. 2, a tunnel 107 exists in a [001] direction. The tunnel 107 serves as the migration path of lithium ions in a [001] direction. The tunnel 107 connects the area 105 with the area 106. Therefore, lithium ions can go back-and-forth between the areas 105 and 106 through the tunnel 107.

Thus, the crystal structure of the monoclinic complex oxide has a large space which can be inserted by lithium ions and has a structural stability. Moreover, the crystal structure of the monoclinic complex oxide has two-dimensional channels enabling rapid diffusion of lithium ions and paths connecting these channels in a [001] direction. Then, the lithium ion can insert into and release from the insertion spaces in the crystal structure at effectively. Further, effective space which is inserted by lithium ion is large in the crystal structure. Therefore, the monoclinic complex oxide can provide a high capacity and high rate performance.

The plane index of the crystal shown in the embodiment has symmetry of space group C2/m. The index is defined according to atomic coordination as described in the Journal of Solid State Chemistry 53, pp 144-147 (1984).

Monoclinic complex oxides represented by the formula $Li_xTi_{1-y}M1_yNb_{2-z}M2_zO_{7+\delta}$ ($0 \leq x \leq 5$, $0 \leq y \leq 1$, $0 \leq z \leq 2$, $-0.3 \leq \delta \leq 0.3$) contain pentavalent cations selected from Nb, V, Ta, and Bi besides tetravalent cations selected from Ti, Zr, Si and Sn.

When lithium ions are inserted in the void 104, the metal ion 101 constituting the skeleton is reduced to a trivalent one, thereby maintaining electric neutrality of a crystal. In the monoclinic complex oxide in the embodiment, not only is a tetravalent cation reduced to a trivalent cation but also a pentavalent cation is reduced to a trivalent cation. For this, the reduction number of the monoclinic complex oxide per weight of active material is larger than that of a compound only containing a tetravalent cation. Therefore, the monoclinic complex oxide can maintain electric neutrality of a crystal even if more lithium ions are inserted. Thus, the monoclinic complex oxide can be more improved in energy density than a compound such as titanium oxide only containing a tetravalent cation. As a result, the theoretical capacity of the monoclinic complex oxide in the embodiment is about 387 mAh/g, which is two or more times that of titanium oxide having a spinel structure.

The monoclinic complex oxide represented by the formula $Li_xTi_{1-y}M1_yNb_{2-z}M2_zO_{7+\delta}$ has one tetravalent cation and two pentavalent cations per chemical formula and therefore, a maximum of five lithium ions per chemical formula can be theoretically inserted. Therefore, in the formula $Li_xTi_{1-y}M1_yNb_{2-z}M2_zO_{7+\delta}$, x is 0 to 5. Furthermore, δ varies in the range of −0.3 to 0.3 depending on the reducing condition of the monoclinic complex oxide. When 7+δ is defined as w, w varies in the range of 6.7 to 7.3. When w is 7.3 or less, this is within the range of error in measurement. When w is less than 6.7, there is a fear that a phase separation of the oxide is occurred.

The monoclinic complex oxide in the embodiment preferably contains Ti and Nb. The monoclinic complex oxide is more preferably $TiNb_2O_7$, which corresponds to the case where y=0 and Z=0 in the formula of the monoclinic complex oxide, that is, an oxide in which the tetravalent cation is $Ti^{4+}$ and the pentavalent cation is $Nb^{5+}$. Because the oxide can provide a crystal lattice ideal for the conduction of lithium ions, more improvements in rapid charge/discharge performance and in electrode capacity can be made.

Furthermore, when the monoclinic complex oxide in the embodiment is subjected to a powder X-ray diffraction (XRD) analysis using Cu-Kα rays, a peak having the highest intensity may appear within an angle 2θ of 25.5° to 26.5° (i.e., 2θ=26°±0.5°) and two peaks may appear within an angle 2θ of 43° to 45° (i.e., 2θ=44°±1°) in a XRD pattern. Here, an intensity of high-angle side peak is referred to as $I_H$, and an intensity of low-angle side peak is referred to as $I_L$. The ratio of the intensities of the two peaks ($I_H/I_L$) is preferably less than 1.

The peak appearing within an angle 2θ of 25.5° to 26.5° (i.e., 2θ=26°±0.5°) is considered to be primarily a peak of the (0 0 3) plane. When the peak appearing within an angle 2θ of 25.5° to 26.5° (i.e., 2θ=26°±0.5°) is a peak having the highest intensity, the crystallite size of the (0 0 3) plane in the crystal structure is estimated to be large. Thus, it is considered that crystallites are grown in a [001] direction. Since the [001] direction is the only path connecting the upper and lower two-dimensional channels, as mentioned above, the growth of the crystallite part improves the lithium ion insertion/release ability in the insertion apace. Also, the effective space useful for lithium ion insertion/release is increased. This ensures that a high charge/discharge capacity and high rate performance can be provided. Furthermore, because high lithium insertion/release ability is obtained, the loss of lithium is reduced, so that an excellent charge/discharge efficiency can be also provided.

A peak of the (1 1 1) plane may appear within an angle 2θ of 25.5° to 26.5° (i.e., 2θ=26°±0.5°). It is often difficult to separate the (0 0 3) plane peak and the (1 1 1) plane peak because the plane interval of the (0 0 3) plane is similar to the one of the (1 1 1) plane.

Two peaks which appear within an angle 2θ of 43° to 45° (i.e., 2θ=44°±1°) are considered to be as follows: the lower angle side peak is a peak of the (0 0 5) plane and the higher angle side peak is a peak of the (−10 0 3) plane.

When the peak intensity ratio ($I_H/I_L$) of a complex oxide is less than 1, the complex oxide has high lithium ion conductivity and high capacity. The peak intensity ratio ($I_H/I_L$) is preferably less than 1.0 and more preferably 0.5 or less. The angle range where two peaks appear is preferably the range of 2θ is preferably from 43.0° to 45.0°, that is, 2θ=44°±1.0°.

<Particle Diameter and BET Specific Surface Area>

The average particle diameter of the complex oxide in this embodiment may be varied corresponding to desired battery performances without any particular limitation. The BET specific surface area of the complex oxide in this embodiment is preferably 5 to 200 m$^2$/g though no particular limitation is imposed.

When the specific surface area is 5 m$^2$/g or more, the contact area with the electrolytic solution can be secured. Thus, good discharge rate performances are easily obtained and also, a charge time can be shortened. When the specific surface area is smaller than 200 m$^2$/g, reactivity with the electrolytic solution is suppressed and therefore, the life performances can be improved. Further, this limited specific surface area allows a slurry containing the active material to be coated with facility in the production of an electrode, which will be described later.

Here, in the measurement of the specific surface area, a method comprising the following step is used:

a molecule of which the adsorption occupying area is known is made to adsorb to the surface of the powder particle at the temperature of liquid nitrogen; and the specific surface area of the powder particle is calculated from the amount of the molecule adsorbed on it. A method that is most frequently used to obtain the specific surface area is the BET method. The BET method uses the low-temperature and low-humidity physical adsorption of an inert gas and is based on the well-known theory for the calculating specific surface area. The theory is obtained by extending the Langmuir theory which is monolayer adsorption theory to multilayer adsorption. The specific surface area calculated in this manner is referred to as the "BET specific surface area".

<Production Method>

The monoclinic complex oxide of the embodiment may be produced in the following method.

An oxide or its salt containing at least one element selected from the group consisting of Ti, Zr, Si and Sn and an oxide or its salt containing at least one element selected from the group consisting of Nb, V, Ta and Bi are blended in such a molar ratio to produce a monoclinic complex oxide represented by the formula $Li_xTi_{1-y}M1_yNb_{2-z}M2_zO_{7+\delta}$ ($0 \leq x \leq 5$, $0 \leq y \leq 1$, $0 \leq z \leq 2$, $-0.3 \leq \delta \leq 0.3$). The above salt is preferably a salt such as a carbonate and nitrate, which is decomposed at a relatively low temperature to form an oxide.

Next, the obtained mixture is ground and blended as uniformly as possible and is then sintered. The sintering is performed at a temperature range from 1000 to 1500° C. for a total of 10 to 40 hrs.

When the sintering temperature is raised to a temperature range from 1300 to 1500° C., a crystallinity of a monoclinic complex oxide is improve. In the case, a peak having the highest intensity appears within an angle 2θ of 25.5° to 26.5° (i.e., 2θ=26°±0.5°), two peaks appear within an angle 2θ of 43° to 45° (i.e., 2θ=44°±1°) in a XRD pattern obtained by using Cu-Kα rays, and the peak intensity ratio ($I_H/I_L$) becomes less than 1.

In the case where the synthesized monoclinic complex oxide contains no lithium, the oxide is turned to a lithium-containing complex oxide when lithium ions are inserted by charging of a battery. Alternatively, a monoclinic complex oxide containing lithium in advance can be synthesized by using a compound containing lithium such as lithium carbonate as the synthetic raw material.

<XRD Measurement>

The XRD measurement of the active material is carried out in the following manner. First, an target sample is ground until the average particle diameter reaches about 5 μm. The average particle diameter can be found by the laser diffraction method. The ground sample is filled in a holder part which is formed on a glass sample plate and has a depth of 0.2 mm. At this time, much care is necessary to fill the holder part fully with the sample. Furthermore, special care should be taken to avoid cracking and formation of voids caused by insufficient filling of the sample.

Then, a separate glass plate is used to smooth the surface of the sample by sufficiently pressing the separate glass plate against the sample. Much care should be taken to avoid too mach or too little amount of the sample to be filled, thereby preventing any rises and dents in the basic plane of the glass holder. When the sample has a high orientation, the sample is filled in a glass capillary. The glass capillary is set on a rotating stand and then the measurement is carried out. Such a method is more preferable because the orientation of the sample is alleviated. The glass plate filled with the sample is set to a powder X-ray diffractometer to obtain a diffraction pattern by using Cu-Kα rays. Then, the measurement is carried out by using Cu-Kα rays to obtain a XRD pattern.

When the sample has a high orientation, there is the possibility of a shift of a peak position and variation in intensity ratio, depending on how the sample is filled. Such a sample is made into a pellet form for measurement. The pellet may be a compressed powder body 10 mm in diameter and 2 mm in thickness, which is manufactured by applying a pressure of about 250 MPa to the sample for 15 minutes. The obtained pellet is set to an X-ray diffractometer to measure the surface. The measurement using such a method eliminates a difference in the results of the measurement between operators, enabling high reproducibility.

When the active material taken out of the electrode by disintegrating the electrode is subjected to XRD measurement, the measurement may be carried out in the following manner.

In order to analyze the crystal state of the active material, the active material is put into a state in which lithium ions are perfectly released from the monoclinic compound. When the active material was used, for example, in the negative electrode, the battery is put into a fully discharged state. However, there is the case where lithium ions remain unremoved even in a discharged state.

Next, the battery is disintegrated in a glove box filled with argon. Then, the disintegrated battery is washed with an appropriate solvent. For example, ethyl methyl carbonate is preferably used as the solvent. The washed electrode may be cut into a size having the same area of the holder of the powder X-ray diffractometer and applied directly to the glass holder. At this time, XRD is measured in advance with regard to the electrode substrate constituted of metal foil to grasp a position where a peak originated from the substrate appears. Furthermore, it is necessary to grasp in advance whether or not there are peaks originated from the ingredients such as a conductive agent and binder. When the peak of the substrate is overlapped on the peak of the active material, it is desired to separate the active material from the substrate prior to the measurement. This is to separate the overlapped peaks and to measure the peak intensity quantitatively. Of course, the procedure may be omitted if these data have been grasped in advance. Although the electrode may be separated physically, it is easily separated by applying ultrasonic wave in a solvent. Then, the electrode recovered in this manner is subjected to the XRD to obtain XRD pattern of the active material.

The results of the XRD obtained in this manner are analyzed by the Rietveld method. In the Rietveld method, a diffraction pattern is calculated from a crystal structure model assumed in advance. Then, the diffraction pattern is fully fitted to actual values so as to improve the accuracy of parameters (for example, lattice constant, atomic coordination and occupation) relating to the crystal structure. Therefore, the features of the crystal structure of the synthesized material can be investigated.

According to the above embodiment, a battery active material which has excellent repetitive rapid charge/discharge performance and a high energy density can be provided.

Second Embodiment

In the second embodiment, a nonaqueous electrolyte battery is provided. The nonaqueous electrolyte battery comprises a negative electrode, a positive electrode, a nonaqueous electrolyte, a separator and a container. In this embodiment, the negative electrode comprises a battery active material according to the first embodiment as a negative electrode active material.

Hereinafter, the negative electrode, positive electrode, nonaqueous electrolyte, separator, and container will be explained in detail.

1) Negative Electrode

The negative electrode comprises a current collector and a negative electrode layer (namely, negative electrode active material-containing layer). The negative electrode layer is formed on one or both surfaces of the current collector and contains a negative electrode active material, and optionally, a conductive agent and a binder.

The negative electrode active material comprises a monoclinic complex oxide represented by the formula $Li_xTi_{1-y}M1_yNb_{2-z}M2_zO_{7+\delta}$ ($0 \le x \le 5$, $0 \le y \le 1$, $0 \le z \le 2$, $-0.3 \le \delta \le 0.3$) described in the first embodiment. Here, M1 is at least one element selected from the group consisting of Zr, Si and Sn and M2 is at least one element selected from the group consisting of V, Ta and Bi.

The negative electrode using such a negative electrode active material can provide a nonaqueous electrolyte battery having excellent rapid charge/discharge performance and a high energy density.

Furthermore, as the monoclinic complex oxide represented by the formula $Li_xTi_{1-y}M1_yNb_{2-z}M2_zO_{7+\delta}$ ($0 \le x \le 5$, $0 \le y \le 1$, $0 \le z \le 2$, $-0.3 \le \delta \le 0.3$), a monoclinic complex oxide characterized by that a peak having the highest intensity appears within an angle $2\theta$ of $25.5°$ to $26.5°$ (i.e., $2\theta=26°\pm0.5°$) and two peaks appear within an angle $2\theta$ of $43°$ to $45°$ (i.e., $2\theta=44\theta\pm1°$) and the ratio of the intensities of two peaks ($I_H/I_L$) is less than 1 in the XRD pattern obtained by using Cu-Kα rays is preferably used. Here, $I_H$ is an intensity of high-angle side peak and $I_L$ is an intensity of low-angle side peak. A monoclinic complex oxide satisfying the above requirements has high crystallinity. Therefore, the negative electrode using such a active material can provide a nonaqueous electrolyte battery having more excellent rapid charge/discharge performance and a higher energy density.

Though a monoclinic complex oxide represented by the formula $Li_xTi_{1-y}M1_yNb_{2-z}M2_zO_{7+\delta}$ ($0 \le x \le 5$, $0 \le y \le 1$, $0 \le z \le 2$, $-0.3 \le \delta \le 0.3$) may be singly used as the negative electrode active material, other compounds may be blended. When other compounds are blended, the monoclinic complex oxide is preferably contained in a ratio of 10% by mass to 90% by mass based on the total mass of the negative electrode active material. Examples of these other compounds include titanium dioxide ($TiO_2$) having an anatase structure, lithium titanate having a ramsdelite structure (for example, $Li_2Ti_3O_7$) and lithium titanate having a spinel structure (for example, $Li_4Ti_5O_{12}$).

The conductive agent is formulated to improve the current-collecting performance and to restrain the contact resistance between the active material and the current collector. Examples of the conductive agent include carbonaceous material such as acetylene black, carbon black, and graphite.

The binder is blended to fill clearances between the dispersed negative electrode active materials and also to bind the active material with the current collector. Examples of the binder include a polytetrafluoroethylene (PTFE), polyvinylidene fluoride (PVdF), fluoro-rubber, and styrene-butadiene rubber.

The active material, conductive agent, and binder in the negative electrode layer are preferably blended in ratios of 68% by mass to 96% by mass, 2% by mass to 30% by mass and 2% by mass to 30% by mass respectively. When the amount of the conductive agent is 2% by mass or more, the current collecting performance of the negative electrode layer can be improved. Furthermore, when the amount of the binder is 2% by mass or more, the binding strength between the negative electrode layer and the current collector is satisfactory and excellent cycle performances may be expected. On the other hand, the amounts of the conductive agent and binder are respectively preferably 30% by mass or less with the view of developing a high-capacity battery.

As the current collector, a material which is electrochemically stable at the lithium absorption and release potential of the negative electrode active material is used. The current collector is preferably made of copper, nickel, stainless or aluminum, or an aluminum alloy containing at least one element selected from Mg, Ti, Zn, Mn, Fe, Cu, and Si. The thickness of the current collector is preferably 5 to 20 μm. A current collector having such a thickness can keep the balance between the strength of the negative electrode and light-weight performances.

The negative electrode can be manufactured by, for example, suspending the negative electrode active material, binder and conductive agent in a usual solvent to prepare a slurry, by applying this slurry to the surface of the current collector and by drying to form a negative electrode layer, which is then pressed.

Alternatively, the negative electrode can be manufactured by mixing the negative electrode active material, binder, and the conductive agent, forming the mixture into a pellet. The pellet can be used as the negative electrode layer. The pellet is placed on the current collector.

2) Positive Electrode

The positive electrode comprises a current collector and a positive electrode layer (namely, positive electrode active material-containing layer). The positive electrode layer is formed on one or both surfaces of the current collector and contains a positive electrode active material, and optionally, a conductive agent and a binder.

Examples of the positive electrode active material include oxides and sulfides. Specific examples of the positive electrode active material include manganese dioxide ($MnO_2$), iron oxide, copper oxide, and nickel oxide impregnated with lithium, lithium-manganese composite oxide (such as $Li_xMn_2O_4$ or $Li_xMnO_2$), lithium-nickel composite oxide (such as $Li_xNiO_2$), lithium-cobalt composite oxide (such as $Li_xCoO_2$), lithium-nickel-cobalt composite oxide (such as $LiNi_{1-y}Co_yO_2$), lithium-manganese-cobalt composite oxide (such as $Li_xMn_yCo_{1-y}O_2$), lithium-manganese-nickel composite oxide having a spinel structure ($Li_xMn_{2-y}Ni_yO_4$), lithium-phosphorous oxide having an olivine structure (such as $Li_xFePO_4$, $Li_xFe_{1-y}Mn_yPO_4$ and $Li_xCoPO_4$), iron sulfate [$Fe_2(SO_4)_3$], vanadium oxide (such as $V_2O_5$) and lithiumnickel-cobalt-manganese composite oxide. Here, x and y satisfy the following equations: $0 \leq x \leq 1$ and $0 \leq y \leq 1$.

As the active material, these compounds may be used either independently or in combinations of two or more.

Preferable examples of the positive electrode active material include oxides having a high positive electrode voltage, for example, lithium-manganese composite oxide (for example, $Li_xMn_2O_4$), lithium-nickel composite oxide (for example, $Li_xNiO_2$), lithium-cobalt composite oxide (for example, $Li_xCoO_2$), lithium-nickel-cobalt composite oxide (for example, $LiNi_{1-y}Co_yO_2$), lithium-manganese-nickel composite oxide having a spinel structure (for example, $Li_xMn_{2-y}Ni_yO_4$), lithium-manganese-cobalt composite oxide (for example, $Li_xMn_yCo_{1-y}O_2$), Lithium-iron phosphate (for example, $Li_xFePO_4$) and lithium-nickel-cobalt-manganese composite oxide. Here, x and y satisfy the following equations: $0 \leq x \leq 1$ and $0 \leq y \leq 1$.

When a cold molten salt is used as the nonaqueous electrolyte, preferable examples of the active material include lithium-iron phosphate, $Li_xVPO_4F$ ($0 \leq x \leq 1$), lithium-manganese composite oxide, lithium-nickel composite oxide and lithium-nickel-cobalt composite oxide. Because each of these compounds is less reactive with a cold molten salt, the battery can be improved in cycle life.

The average primary particle diameter of the positive electrode active material is preferably 100 nm to 1 μm. A positive electrode active material having an average primary particle diameter of 100 nm or more is easily handled in industrial production. A positive electrode active material having an average primary particle diameter of 1 μm or less enables lithium ions to diffuse smoothly in solid.

The specific surface area of the positive electrode active material is preferably 0.1 $m^2/g$ to 10 $m^2/g$. A positive electrode active material having a specific surface area of 0.1 $m^2/g$ or more can secure lithium ion-absorption and release sites sufficiently. A positive electrode active material having a specific surface area of 10 $m^2/g$ or less is easily handled in industrial production and ensures a good charge-discharge cycle performance.

The binder is formulated to bind the active material with the current collector. Examples of the binder include a polytetrafluoroethylene (PTFE), polyvinylidene fluoride (PVdF) and fluoro-rubber.

The conductive agent is formulated as required to improve the current collecting ability of the active material and to reduce the contact resistance between the active material and the current collector. Examples of the conductive agent include carbonaceous materials such as acetylene black, carbon black, and graphite.

The active material and binder in the positive electrode layer are preferably formulated in ratios of 80% by mass to 98% by mass and 2% by mass to 20% by mass respectively. When the amount of the binder is 2% by mass or more, satisfactory electrode strength is obtained. Further, when the amount of the binder is 20% by mass or less, the amount of the insulating material of the electrode can be reduced, leading to reduced internal resistance.

When the conductive agent is added, the active material, binder and conductive agent are preferably formulated in ratios of 77% by mass to 95% by mass, 2% by mass to 20% by mass and 3% by mass to 15% by mass respectively. The conductive agent can produce the aforementioned effect by blending it in an amount of 3% by mass or more. When its amount is designed to be 15% by mass or less, on the other hand, the decomposition of the nonaqueous electrolyte on the surface of the conductive agent can be reduced even when the battery is stored at high temperatures.

The current collector is preferably made of an aluminum foil or aluminum alloy foil containing at least one element selected from Mg, Ti, Zn, Ni, Cr, Mn, Fe, Cu and Si.

The thickness of the aluminum foil or aluminum alloy foil is preferably 5 μm to 20 μm and more preferably 15 μm or less. The purity of the aluminum foil is 99% by mass or more. The content of transition metals such as iron, copper, nickel and chromium contained in the aluminum foil or aluminum alloy foil is preferably designed to be 1% by mass or less.

The positive electrode can be manufactured by, for example, suspending the positive electrode active material and binder and the conductive agent if necessary, in an appropriate solvent to prepare a slurry, by applying this slurry to the surface of the current collector and drying to form a positive electrode layer, which is then pressed.

Alternatively, the positive electrode can be manufactured by mixing the positive electrode active material and binder, and the conductive agent if necessary, forming the mixture into a pellet. The pellet can be used as the positive electrode layer. The pellet is placed on the current collector.

3) Nonaqueous Electrolyte

Examples of the nonaqueous electrolyte include a liquid nonaqueous electrolyte and a gel-like nonaqueous electrolyte. The liquid nonaqueous electrolyte is prepared by dissolving an electrolyte in an organic solvent. The gel-like nonaqueous electrolyte is prepared by forming a composite of a liquid electrolyte and a polymer material.

The liquid nonaqueous electrolyte is dissolved in an organic solvent in a concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$], or mixtures of these compounds. The electrolyte is preferably one which is scarcely oxidized even at a high potential and $LiPF_6$ is most preferable.

Examples of the organic solvent include cyclic carbonates such as propylene carbonate (PC), ethylene carbonate (EC) and vinylene carbonate, chain carbonates such as diethyl carbonate (DEC), dimethyl carbonate (DMC) and methylethyl carbonate (MEC), cyclic ethers such as tetrahydrofuran (THF), 2-methyltetrahydrofuran (2MeTHF) and dioxolan (DOX), chain ethers such as dimethoxyethane (DME) and diethoethane (DEE), γ-butyrolactone (GBL), acetonitrile (AN) and sulfolan (SL). These organic solvents may be used either singly or in combinations of two or more.

Examples of the polymer material include a polyvinylidene fluoride (PVdF), polyacrylonitrile (PAN) and polyethylene oxide (PEO).

A cold molten salt (ionic melt) containing lithium ions, polymer solid electrolyte, inorganic solid electrolyte and the like may also be used as the nonaqueous electrolyte.

The cold molten salt (ionic melt) means compounds which may exist in a liquid state at normal temperature (15 to 25° C.) among organic salts constituted of combinations of organic cations and anions. The cold molten salts include those which singly exist in a liquid state, those which are put into a liquid state when mixed with an electrolyte and those which are put into a liquid state when dissolved in an organic solvent. Generally, the melting point of the cold molten salt used in a nonaqueous electrolyte battery is 25° C. or less. Further, the organic cation generally has a quaternary ammonium skeleton.

The polymer solid electrolyte is prepared by dissolving an electrolyte in a polymer material and by solidifying the electrolyte mixture.

The inorganic solid electrolyte is a solid material having lithium ion-conductivity.

4) Separator

The separator may be formed of a porous film comprising a polyethylene, polypropylene, cellulose or polyvinylidene fluoride (PVdF), or synthetic resin nonwoven fabric. Among these materials, a porous film formed of a polyethylene or polypropylene melts at a fixed temperature, making it possible to shut off current and is therefore preferable from the viewpoint of improving safety.

5) Container

A container made of a laminate film or a metal container may be used. The laminate film preferably has a thickness of 0.5 mm or less. The metal container preferably has a thickness of 1.0 mm or less. The thickness of the laminate film is more preferably 0.2 mm or less. The metal container has a thickness of, more preferably, 0.5 mm or less and most preferably 0.2 mm or less.

Examples of the shape of the container include a flat type (thin type), angular type, cylinder type, coin type and button type. The container having a size corresponding to the dimensions of a battery are used. For example, containers for small-sized batteries to be mounted on portable electronic devices and containers for large-sized batteries to be mounted on, for example, two- to four-wheel vehicles are used.

As the laminate film, a multilayer film prepared by interposing a metal layer between resin layers may be used. The metal layer is preferably formed of an aluminum foil or aluminum alloy foil to reduce the weight of the battery. For example, polymer materials such as polypropylene (PP), polyethylene (PE), nylon and polyethylene terephthalate (PET) may be used for the resin layer. The laminate film can be molded into a desired shape by sealing through thermal fusion.

The metal container is made of aluminum, an aluminum alloy or the like. The aluminum alloy is preferably an alloy containing one or more elements selected from magnesium, zinc, and silicon. When the alloy contains transition metals such as iron, copper, nickel and chromium, the amount of the transition metals is preferably 1 mass % or less.

6) Nonaqueous Electrolyte Battery

Next, the nonaqueous electrolyte battery according to the second embodiment will be explained in more detail with reference to the drawings. The same reference numeral is attached to a structure common to the embodiments and duplicated explanations are omitted here. Each drawing is a typical view for explaining the embodiment and for promoting the understanding of the embodiment. Though there are parts different from an actual battery in shape, dimension and ratio, these structural designs may be properly changed taking the following explanations and known technologies into consideration.

Figure 3:
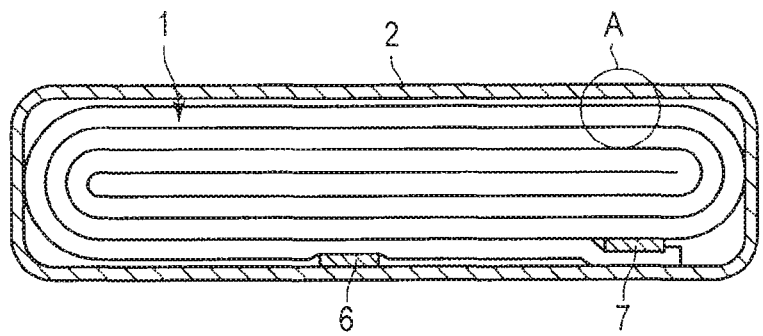
FIG. 3 is a sectional view of a flat type nonaqueous electrolyte battery according to a second embodiment.
Figure 4:
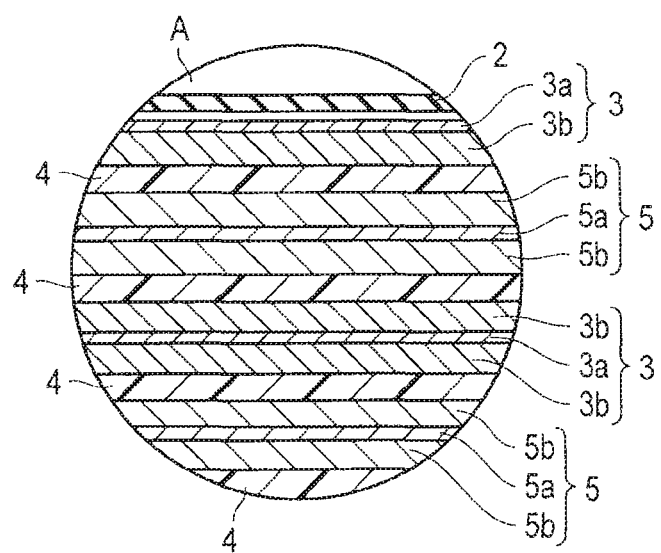
FIG. 4 is an enlarged sectional view of a part A of FIG. 3.

FIG. 3 is a sectional view of a flat type nonaqueous electrolyte secondary battery. FIG. 4 is an enlarged sectional view of the A-part of FIG. 3.

A flat type coil electrode group 1 is accommodated in a baggy container 2 made of a laminate film obtained by interposing an aluminum foil between two resin layers. The coil electrode groups 1 having a flat form are formed by spirally coiling a laminate obtained by laminating a negative electrode 3, a separator 4, a positive electrode 5 and a separator 4 in this order from the outside and by press-molding the coiled laminate.

The negative electrode 3 comprises a negative electrode current collector 3a and a negative electrode layer 3b. The outermost negative electrode 3 has a structure in which a negative electrode layer 3b is formed on one inside surface of a negative electrode current collector 3a as shown in FIG. 4. Other negative electrodes 3 each have a structure in which a negative electrode layer 3b is formed on each surface of the current collector 3a.

The positive electrode 5 comprises a positive electrode current collector 5a and a positive electrode layer 5b. The positive electrode layer 5b is formed on each surface of a positive electrode current collector 5a.

In the vicinity of the outer peripheral end of the coil electrode group 1, a negative electrode terminal 6 is connected to the negative electrode current collector 3a of the outermost negative electrode 3 and a positive electrode terminal 7 is connected to the positive electrode current collector 5a of the inside positive electrode 5. The negative electrode terminal 6 and positive electrode terminal 7 are externally extended from an opening part of the baggy container 2. A liquid nonaqueous electrolyte is injected from the opening part of the baggy container 2. The opening part of the baggy container 2 is closed by heat sealing with the negative electrode terminal 6 and positive electrode terminal 7 extended out of the opening part to thereby perfectly seal the coil electrode group 1 and liquid nonaqueous electrolyte.

The negative electrode terminal 6 is made of, for example, a material having electric stability and conductivity at the Li-absorption and release potential of the negative electrode active material. Specifically, examples of these materials include copper, nickel, stainless and aluminum. The negative electrode terminal 6 is preferably made of the same material as the negative electrode current collector 3a to reduce the contact resistance with the negative electrode current collector.

The positive electrode terminal 7 is made of, for example, a material having electric stability and conductivity in a potential range from, preferably, 3 V to 5 V relative to a lithium ion metal. Specific examples of these materials include aluminum alloys containing elements such as Mg, Ti, Zn, Mn, Fe, Cu and Si, and aluminum. The positive electrode terminal 7 is preferably made of the same material as the positive electrode current collector 5a to reduce the contact resistance with the positive electrode current collector 5a.

Figure 5:
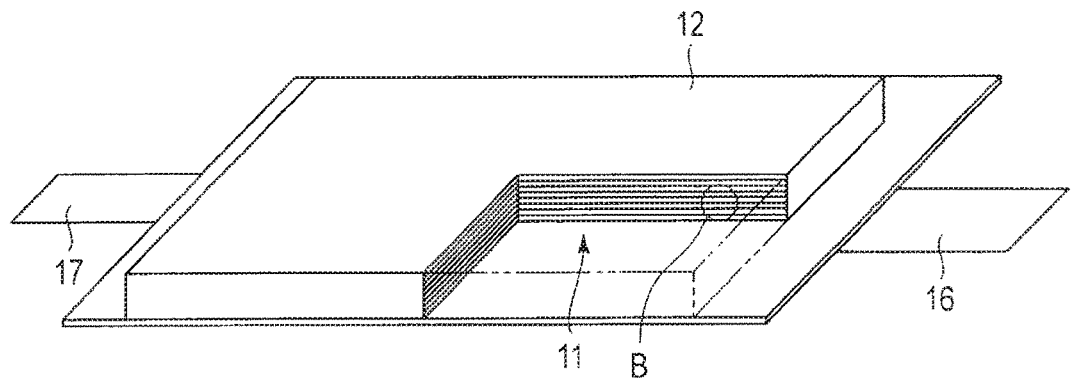
FIG. 5 is a partially broken perspective view of another flat type nonaqueous electrolyte battery according to the second embodiment.
Figure 6:
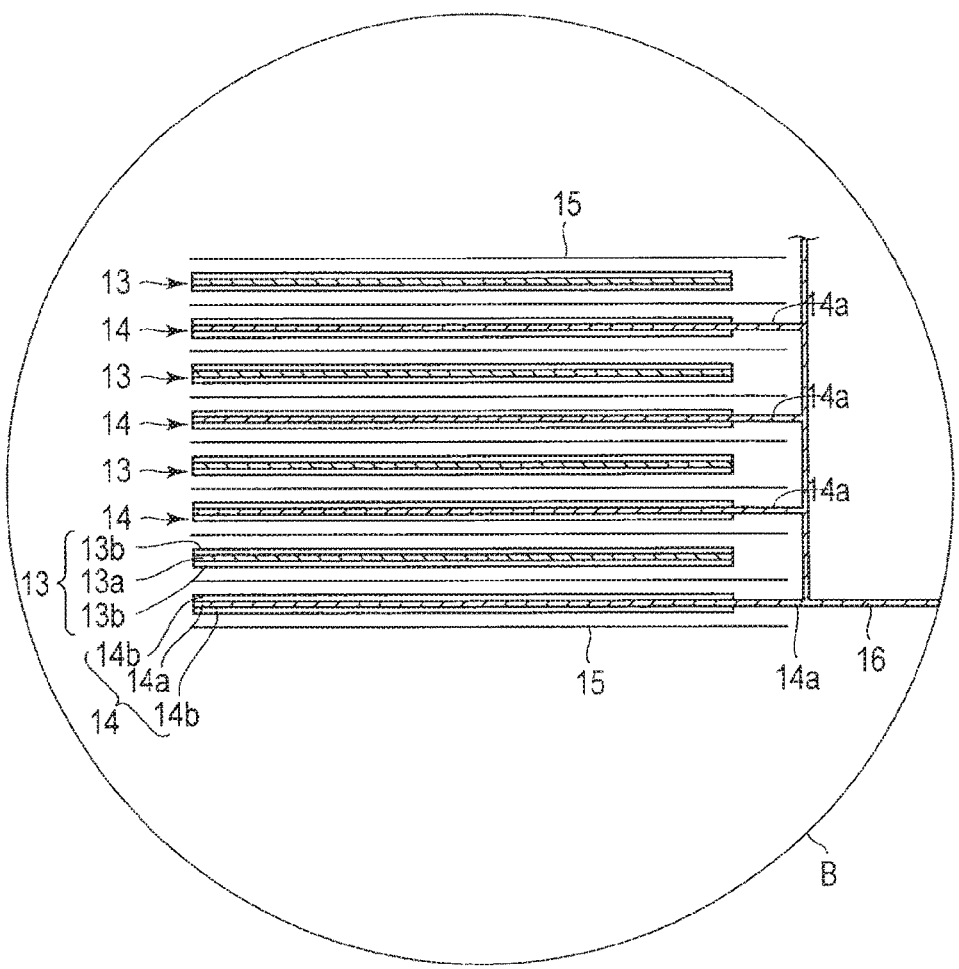
FIG. 6 is an enlarged sectional view of a part B of FIG. 5.

The nonaqueous electrolyte secondary battery according to the third embodiment is not limited to the structure shown in FIG. 3 and FIG. 4 and may have a structure as shown in, for example, FIG. 5 and FIG. 6. FIG. 5 is a partly broken perspective view typically showing another flat type nonaqueous secondary battery, and FIG. 6 is an enlarged sectional view of the B part of FIG. 5.

A laminate type electrode group 11 is accommodated in a container 12 made of a laminate film obtained by interposing a metal layer between two resin layer. The laminate type electrode group 11 has a structure in which a positive electrode 13 and a negative electrode 14 are, as shown in FIG. 6, alternately laminated with a separator 15 interposed therebetween. The positive electrodes 13 exist in plural, each being provided with a current collector 13a and a positive electrode active material-containing layer 13b formed on each side of the current collector 13a. The negative electrodes 14 exist in plural, each being provided with a current collector 14a and a negative electrode active material-containing layer 14b carried on each side of the current collector 14a. One side of the current collector 14a of each negative electrode 14 is projected from the positive electrode 13. The projected current collector 14a is electrically connected to a band-shaped negative electrode terminal 16. The end of the band-shaped negative electrode terminal 16 is externally drawn out of the container 12. Further, of the current collector 13a of the positive electrode 13, the side positioned opposite to the projected side of the current collector 14a is projected from the negative electrode 14. The current collector 13a projected from the negative electrode 14 is electrically connected to a band-shaped positive electrode terminal 17. The end of the band-shaped positive electrode terminal 17 is positioned opposite to the negative electrode terminal 16 and drawn out of the side of the container 12.

According to the above embodiment, a nonaqueous electrolyte battery which has an excellent repetitive rapid charge/discharge performance and a high energy density can be provided.

Third Embodiment

Next, a battery pack according to a third embodiment will be explained with reference to the drawings. The battery pack comprises one or two or more of the above nonaqueous electrolyte batteries (unit cells) according to the second embodiment. When the battery pack includes two or more unit cells, these unit cells are disposed in such a manner that they are electrically connected in series or in parallel.

Figure 7:
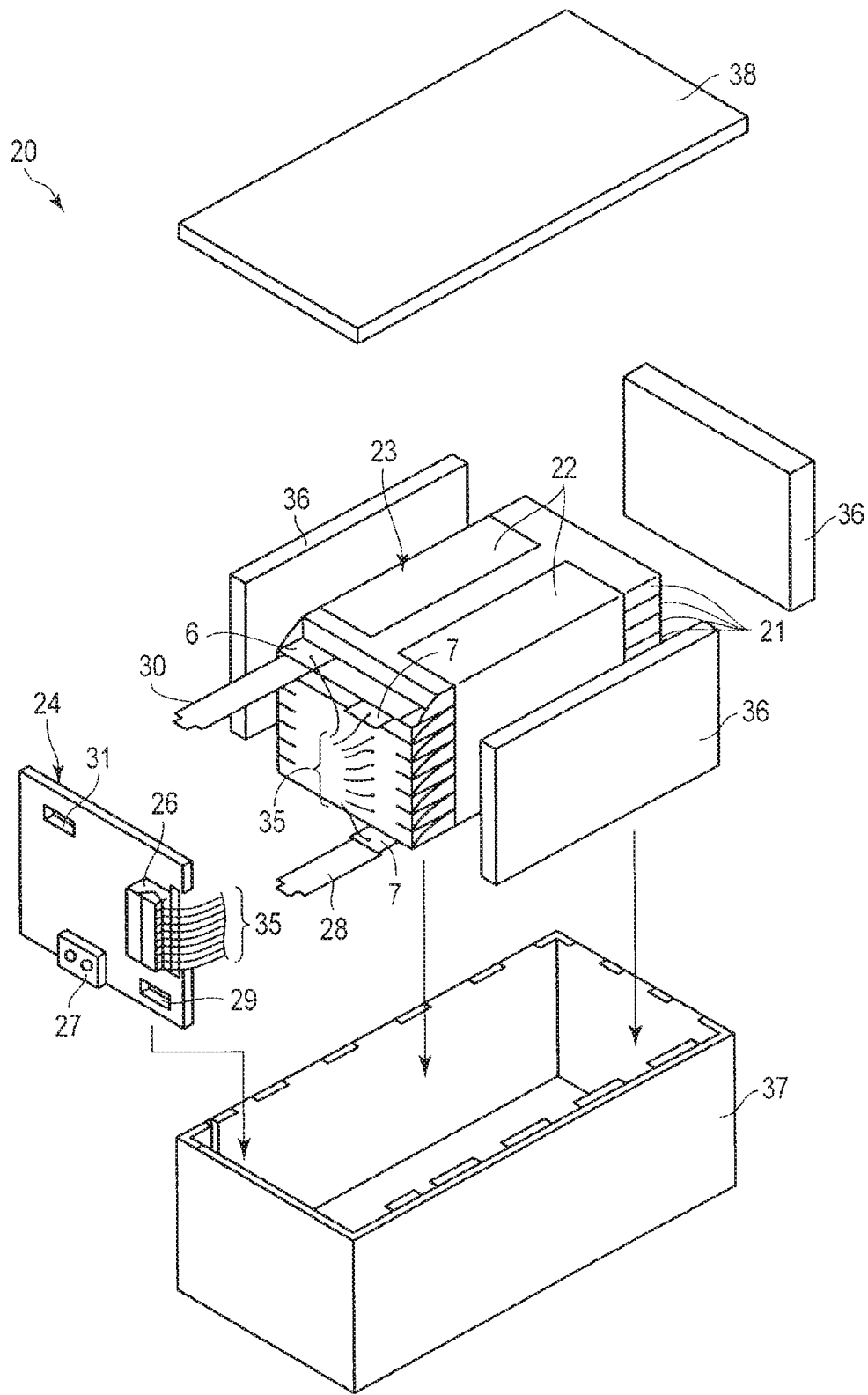
FIG. 7 is an exploded perspective view of a battery pack according to a third embodiment.
Figure 8:
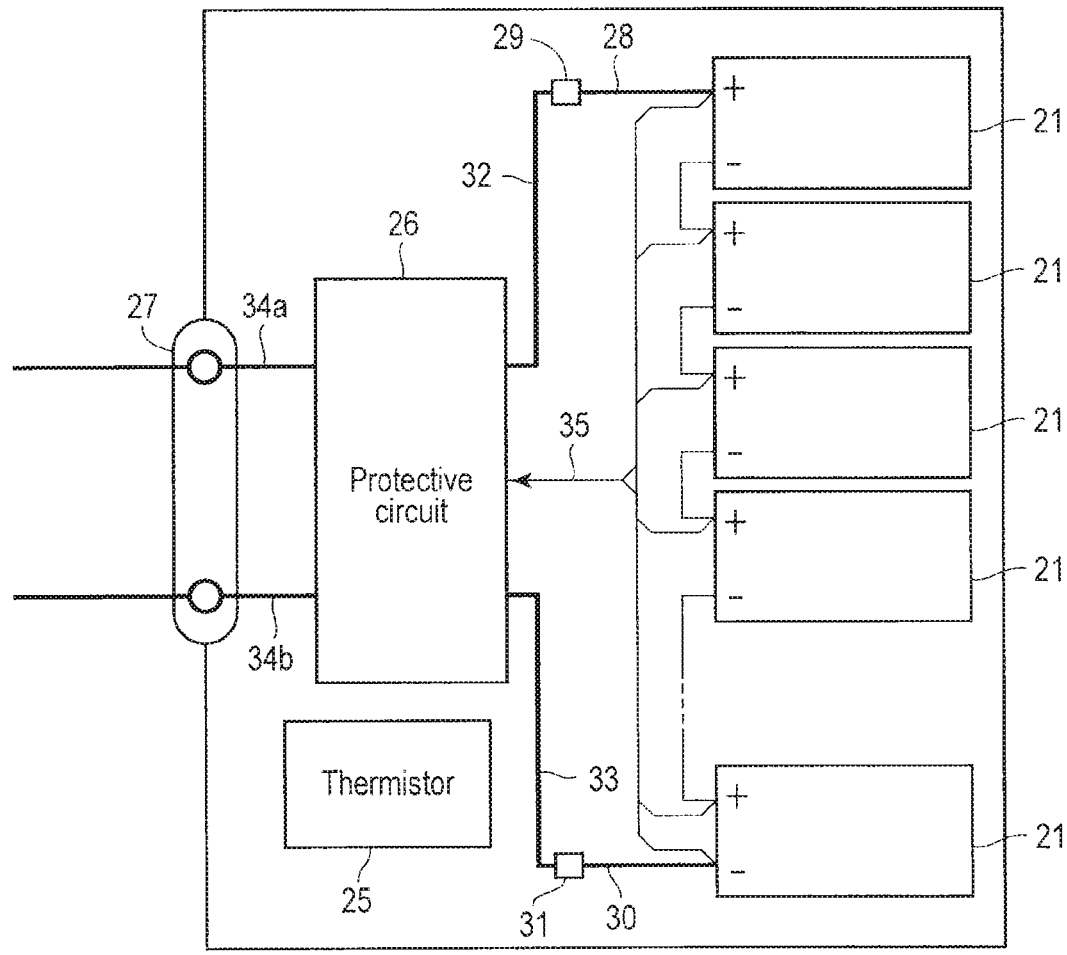
FIG. 8 is a block diagram showing an electric circuit of the battery pack of FIG. 7.

FIG. 7 and FIG. 8 show an example of a battery pack 20. This battery pack 20 comprises two or more flat-type unit cells 21 each having the structure shown in FIG. 3. FIG. 7 is an exploded perspective view of the battery pack 20. FIG. 8 is a block pattern showing the electric circuit of the battery pack 20 shown in FIG. 7.

A plurality of unit cells 21 are laminated such that the externally extended negative electrode terminal 6 and positive electrode terminal 7 are arranged in the same direction and fastened with an adhesive tape 22 to thereby constitute a battery module 23. These unit cells 21 are electrically connected in series as shown in FIG. 8.

A printed wiring board 24 is disposed opposite to the side surface of the unit cell 21 from which the negative electrode terminal 6 and positive electrode terminal 7 are extended. As shown in FIG. 8, a thermistor 25, a protective circuit 26 and an energizing terminal 27 connected to external devices are mounted on the printed wiring board 24. An insulating plate (not shown) is attached to the surface of the protective circuit substrate 24 facing the battery module 23 to avoid unnecessary connection with the wiring of the battery module 23.

A positive electrode side lead 28 is connected to the positive electrode terminal 7 positioned on the lowermost layer of the battery module 23 and one end of the positive electrode side lead 28 is inserted into and electrically connected to a positive electrode side connector 29 of the printed wiring board 24. A negative electrode side lead 30 is connected to the negative electrode terminal 6 positioned on the uppermost layer of the battery module 23 and one end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detects the temperature of the unit cell 21 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is a predetermined one or higher. Also, the predetermined condition means, for example, the case of detecting overcharge, overdischarge and over-current of the unit cell 21. The detections of this overcharge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIG. 7 and FIG. 8, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery module 23 excluding the side surface from which the positive electrode terminal 7 and negative electrode terminal 6 are projected.

The battery module 23 is accommodated in a receiving container 37 together with each protective sheet 36 and printed wiring board 24. Specifically, the protective sheet 36 is disposed on each inside surface in the direction of the long side and on one of the inside surfaces in the direction of the short side of the receiving container 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the receiving container 37.

Here, a thermally contracting tape may be used in place of the adhesive tape 22 to secure the battery module 23. In this case, after the protective sheet is disposed on both sides of the battery module and the thermally contracting tubes are wound around the battery module; the thermally contracting tape is contracted by heating to fasten the battery module.

The structure in which the unit cells 21 are connected in series is shown in FIG. 7 and FIG. 8. However, these unit cells may be connected in parallel to increase the capacity of the battery. The assembled battery packs may be further connected in series or in parallel.

Also, the structure of the battery pack is appropriately changed according to its use. The battery pack is preferably used in applications exhibiting excellent cycle performances when a large current is extracted. Specific examples of these applications include power sources for digital cameras, and power sources mounted on vehicles such as two- to four-wheel vehicles hybrid electric cars, two- to four-wheel electric cars and assist bicycles. The battery pack is preferably used for power sources mounted on vehicles.

According to these embodiments, a battery pack having an excellent repetitive rapid charge/discharge performance and a high energy density can be provided.

EXAMPLES

The embodiment will be explained in more detail by way of examples. The identification of the crystal phase and estimation of crystal structure of the synthesized complex oxide were made by the XRD method using Cu-Kα rays. Furthermore, the composition of the product was analyzed by the ICP method to confirm whether a target product was obtained or not.

Example 1

Synthesis

A complex oxide represented by the formula $TiNb_2O_7$ was synthesized. Among monoclinic complex oxides represented by the formula $Li_xTi_{1-y}M1_yNb_{2-z}M2_zO_{7+\delta}$, the complex oxide was obtained when x=0, y=0 and z=0. As starting materials, commercially available oxide reagents $Nb_2O_5$ and $TiO_2$ were used. Powders of these starting materials were weighed in a ratio by mol of 1:1 (i.e., Nb:Ti=2:1) and mixed in a mortar. The obtained mixture was then put into an electric furnace and sintered at 1250° C. for a total of 20 hrs. The synthetic method used herein was based on the method described in M. GASPERIN, Journal of Solid State Chemistry 53, pp 144-147 (1984).

(XRD Measurement)

The obtained sample was measured by XRD in the following manner. First, the sample was ground until the average particle diameter reached about 10 m. The ground sample was filled in a holder part which was formed on a glass sample plate and had a depth of 0.2 mm. Further, a separate glass plate was used to smooth the surface of the sample by sufficiently pressing the separate glass plate against the sample. Further, the glass plate filled with the sample was set to a powder X-ray diffractometer to obtain a XRD pattern by using Cu-Kα rays.

Figure 9:
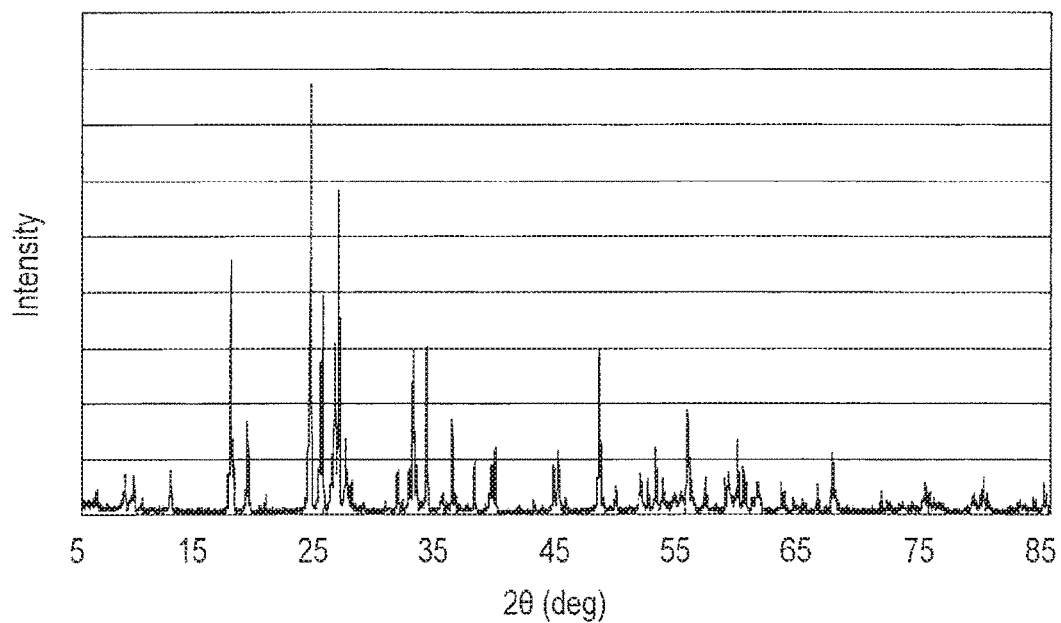
FIG. 9 is a XRD pattern for a monoclinic complex oxide synthesized in Example 1.

As a result, a XRD pattern shown in FIG. 9 was obtained. From the results of crystal structure analysis according to the Rietveld method, it was confirmed that the synthesized sample had a target monoclinic crystal.

In the XRD pattern, as shown in FIG. 9, a peak having the highest intensity appeared at an angle 2θ=23.96°, and two peaks appeared within an angle 2θ of 43° to 45° (i.e., 2θ=44°±1°). These two peaks are specifically a low-angle side peak at an angle 2θ=44.06° and a high-angle side peak at an angle 2θ=44.46°. The peak intensity ratio ($I_H/I_L$) was 1.37.

(Production of Electrodes)

Acetylene black was mixed as a conductive agent in the above synthesized monoclinic complex oxide in a ratio of 10 parts by weight to 100 parts by weight of the oxide. The mixture was dispersed in N-methyl-2-pyrrolidone (NMP) and a polyvinylidene fluoride (PVdF) was added in the mixture as a binder in a ratio of 10 parts by weight to 100 parts by weight of the oxide. Thus, electrode slurry was obtained. This slurry was applied to a current collector made of an aluminum foil by using a blade. The slurry was dried at 130° C. for 12 hrs in vacuo to obtain an electrode.

Example 2

Synthesis

A complex oxide represented by the formula $TiNb_2O_7$ was synthesized. Among monoclinic complex oxides represented by the formula $Li_xTi_{1-y}M1_yNb_{2-z}M2_zO_{7+\delta}$, the complex oxide was obtained when x=0, y=0 and z=0. As starting materials, commercially available oxide reagents $Nb_2O_5$ and $TiO_2$ were used. Powders of these starting materials were weighed in a ratio by mol of 1:1 and mixed in a mortar. The obtained mixture was then put into an electric furnace and sintered at 1400° C. for a total of 20 hrs.

(XRD Measurement)

The obtained sample was measured by XRD in the same manner as in Example 1. As a result, a XRD pattern shown in FIG. 10 was obtained. From the results of crystal structure analysis according to the Rietveld method, it was confirmed that the synthesized sample had a target monoclinic crystal.

Figure 10:
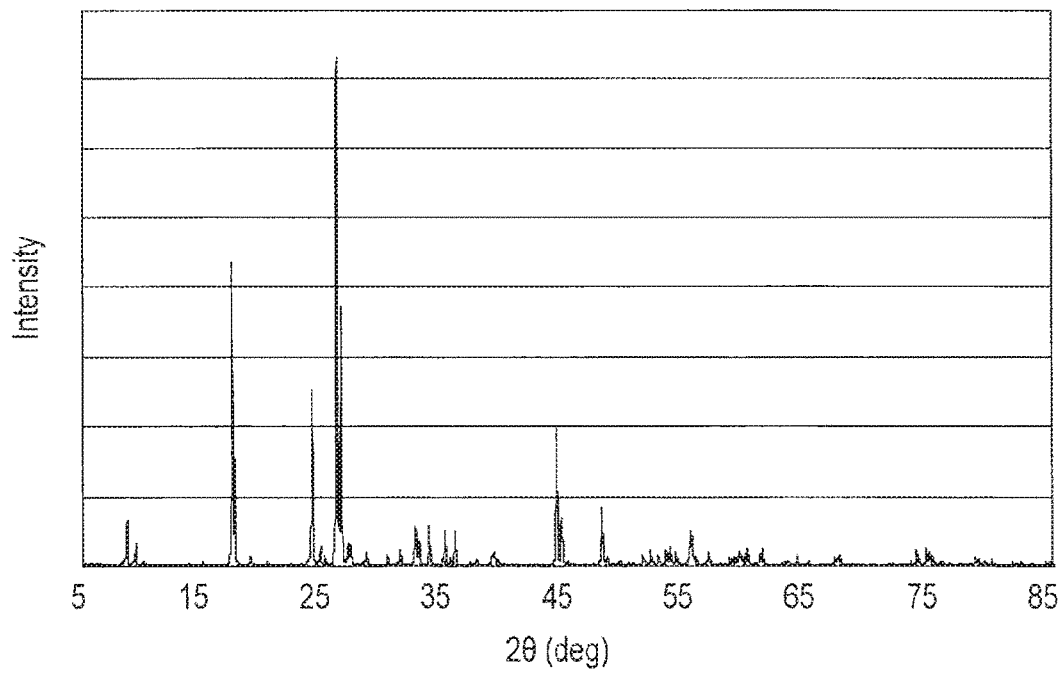
FIG. 10 is a XRD pattern for a monoclinic complex oxide synthesized in Example 2.

In the XRD pattern as shown in FIG. 10, a peak having the highest intensity appeared at an angle 2θ=26.14°, two peaks appeared within an angle 2θ of 43° to 45° (i.e., 2θ=44°±1°). These two peaks are specifically a low-angle side peak at an angle 2θ=44.12° and a high-angle side peak at an angle 2θ=44.52°. The peak intensity ratio ($I_H/I_L$) was 0.32.

(Production of Electrodes)

Using the above synthesized monoclinic complex oxide, an electrode was manufactured in the same manner as in Example 1.

Comparative Example

Synthesis

As a comparative example, a complex oxide represented by the formula $LiSr_{0.5}Ti_3O_7$ was synthesized. The cation contained in the complex oxide is a tetravalent cation and a divalent cation. The tetravalent cation in the crystal is Ti and the divalent cation is Sr. This complex oxide is a compound described in I. Beharouak and K. Amine, Electrochemistry Communications, 5, 435 (2003).

As starting materials, commercially available reagents $Li_2CO_3$, $SrCO_3$, and $TiO_2$ were used. Powders of these starting materials were weighed in a ratio by mol according to a target composition and mixed in a mortar. The obtained mixture was then put into an electric furnace and sintered at 1250° C. for a total of 20 hrs.

(XRD Measurement)

The obtained sample was measured by XRD in the same manner as in Example 1. As a result, a XRD pattern shown in FIG. 11 was obtained. The characteristic of the XRD pattern correspond to the one of the XRD pattern of the compound described in I. Beharouak and K. Amine, Electrochemistry Communications, 5, 435 (2003). Therefore, it appeared that a target complex oxide was obtained. Furthermore, Rietveld analysis was carried out based the information of the article, to confirm that the target complex oxide was obtained. In the XRD pattern as shown in FIG. 11, a peak having the highest intensity appeared at an angle close to angle 2θ=46°, and two peaks did not appear within an angle 2θ of 43° to 45° (i.e., 2θ=44°±1°).

(Production of Electrodes)

Using the above synthesized complex oxide, an electrode was manufactured in the same manner as in Example 1.

<Electrochemical Measurement>

An electrochemical measuring cell was manufactured using each electrode of Examples 1 and 2 and Comparative Example, a metal lithium foil as a counter electrode, and a nonaqueous electrolyte. As the nonaqueous electrolyte, a solution obtained by dissolving 1 M of lithium hexafluorophosphate in a mixed solvent of ethylene carbonate and diethyl carbonate (volume ratio: 1:1) was used.

A charge/discharge test of each measuring cell of Examples 1 and 2 and Comparative Example was carried out at ambient temperature. The test was carried out at a potential range from 1.0 V to 3.0 V relative to metal lithium electrode and at a charge/discharge current of 0.2 C (hourly discharge rate). However, the test using the measuring cell of Comparative Example was carried out at a potential range from 1.0 V to 2.0 V to protect the crystal structure.

Next, the charge/discharge was repeated 50 cycles (charge/discharge operations make one cycle) to examine the discharge capacity retention ratio after 50 cycles. The charge/discharge operations were carried out at a potential range from 1.0 V to 3.0 V relative to a metal lithium electrode in the examples and at a potential range from 1.0 V to 2.0 V relative to a metal lithium electrode in the comparative example, at a current of 1 C (hourly discharge rate) at ambient temperature (25° C.). After 50 cycles, charge/discharge operations were carried out again at a current of 0.2 C (hourly discharge rate) to calculate the capacity retention ratio when the initial discharge capacity was set to 100%.

Furthermore, as an index of rate performance, the ratio of 1.0 C discharge capacity to 0.2 C discharge capacity was calculated.

<Results>

The results are shown in Table 1.

The initial charge/discharge curves obtained using each measuring cell of Examples 1 and 2 and Comparative Example are shown in FIG. 12. Furthermore, the results of the charge/discharge test are shown in Table 1.

TABLE 1

|  | Peak intensity ratio $I_H/I_L$ | Initial discharge capacity (mAh/g) | Initial charge/discharge efficiency (%) | Discharge capacity retention ratio after 50 cycles (%) | Charge/discharge efficiency after 50 cycles (%) | 1 C./0.2 C. capacity ratio |
|---|---|---|---|---|---|---|
| Example 1 | 1.37 | 261 | 84.7 | 89.1 | 99.6 | 0.99 |
| Example 2 | 0.32 | 279 | 86.5 | 90.3 | 99.8 | 0.99 |
| Comparative Example | No peak | 113 | 83.3 | 78.3 | 99.3 | 0.85 |

As shown in Table 1 and FIG. 12, measuring cells of Examples 1 and 2 using a complex oxide containing a tetravalent cation and a pentavalent cation in the crystal structure were more improved in initial discharge capacity and initial charge/discharge efficiency than Comparative Example using a complex oxide containing a divalent cation and a tetravalent cation in the crystal structure. Furthermore, measuring cells of Examples 1 and 2 had a higher discharge capacity retention ratio and charge/discharge efficiency after 50 cycles, showing that measuring cells of Examples 1 and 2 can be charged/discharged stably. Furthermore, the 1 C/0.2 C capacity ratio was high, so it was shown that these Examples had a high rate performance. The reason why the complex oxide containing a tetravalent cation and a pentavalent cation exhibits excellent performances is considered to be that because a pentavalent cation attracts the electron clouds of oxide ions, the electronic correlation between Li and these oxide ions is decreased, and a pentavalent cation is reduced with the insertion of Li.

Moreover, in the XRD pattern for Example 2, as shown in FIG. 10, a peak having the highest intensity which considered as a peak of the (0 0 3) plane appeared within an angle 2θ of 25.5° to 26.5° (i.e., 2θ=26°±0.5°), and the width of the peak was sharp. Therefore, crystallites in a [001] direction are considered to be well grown. Furthermore, the peak intensity ratio ($I_H/I_L$) was 0.32. Example 2 was superior to Example 1 having a peak intensity ratio of 1.37 in any of the charge/discharge capacity, charge/discharge efficiency, capacity retention ratio, and rate performance.

From the above results, it is considered that a monoclinic complex oxide characterized by that a peak having the highest intensity appears within an angle 2θ of 25.5° to 26.5° (i.e., 2θ=26°±0.5°) and two peaks appear within an angle 2θ of 43° to 45° (i.e., 2θ=44°±1°) in XRD pattern and the peak intensity ratio ($I_H/I_L$) is less than 1 has more excellent performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery, comprising:
   a negative electrode, comprising:
      a negative electrode layer comprising
         a negative electrode active material comprising a monoclinic complex oxide represented by the formula $Li_xTi_{1-y}M1_yNb_{2-z}M2_zO_{7+\delta}$, wherein M1 is at least one selected from the group consisting of Zr, Si and Sn; M2 is at least one element selected from the group consisting of V, Ta and Bi; $0 \le x \le 5$; $0 \le y \le 1$; $0 \le z \le 2$; and $-0.3 \le \delta \le 0.3$;
      a conductive agent comprising at least one selected from the group consisting of acetylene black, carbon black and graphite; and
      a binder; and
      a current collector;
   a positive electrode; and
   a nonaqueous electrolyte,
   wherein
   ratios of the negative electrode active material, the conductive agent, and the binder in the negative electrode layer are 68% by mass to 96% by mass, 2% by mass to 30% by mass, and 2% by mass to 30% by mass, respectively; and
   in a powder X-ray diffraction pattern of the negative electrode active material obtained by using Cu-Kα rays,
      a peak of a powder X-ray diffraction having the highest intensity appears within an angle 2θ of 25.5° to 26.5°; and
      two peaks appear within an angle 2θ of 43° to 45° with $I_H$ being an intensity of high-angle side peak and $I_L$ being an intensity of low-angle side peak, and a ratio $I_H/I_L$ is 0.5 or less.

2. The nonaqueous electrolyte battery according to claim 1, wherein the monoclinic complex oxide is a compound represented by the formula $TiNb_2O_7$.

3. The nonaqueous electrolyte battery according to claim 1, wherein a crystallite of the monoclinic complex oxide is grown in a [001] direction.

4. The nonaqueous electrolyte battery according to claim 1, wherein the negative electrode layer further comprises at least one member selected from the group consisting of titanium dioxide having an anatase structure, lithium titanate having a ramsdelite structure and lithium titanate having a spinel structure.

5. The nonaqueous electrolyte battery according to claim 1, wherein the nonaqueous electrolyte comprises at least one member selected from the group consisting of a liquid nonaqueous electrolyte, a gel-like nonaqueous electrolyte, a cold molten salt, a polymer solid electrolyte and an inorganic solid electrolyte.

6. The nonaqueous electrolyte battery according to claim 1, wherein the nonaqueous electrolyte comprises a liquid nonaqueous electrolyte.

7. The nonaqueous electrolyte battery according to claim 1, wherein the nonaqueous electrolyte comprises at least one of a polymer solid electrolyte and a inorganic solid electrolyte.

8. The nonaqueous electrolyte battery according to claim 1, wherein the current collector of the negative electrode is made of copper, nickel, stainless or aluminum, or an aluminum alloy containing at least one element selected from Mg, Ti, Zn, Mn, Fe, Cu, and Si.

9. The nonaqueous electrolyte battery according to claim 1, wherein a thickness of the current collector of the negative electrode is 5 to 20 μm.

10. The nonaqueous electrolyte battery according to claim 1, wherein the positive electrode comprises a positive electrode active material, wherein the positive electrode active material is at least one member selected from the group consisting of manganese dioxide, iron oxide, copper oxide and nickel oxide impregnated with lithium, lithium-manganese composite oxide, lithium-nickel composite oxide, lithium-cobalt composite oxide, lithium-nickel-cobalt composite oxide, lithium-manganese-cobalt composite oxide, lithium-manganese-nickel composite oxide having a spinel structure, lithium-phosphorous oxide having an olivine structure, iron sulfate, vanadium oxide and lithium-nickel-cobalt-manganese composite oxide.

11. The nonaqueous electrolyte battery according to claim 1, wherein M1 is Zr.

12. The nonaqueous electrolyte battery according to claim 1, wherein M1 is Si.

13. The nonaqueous electrolyte battery according to claim 1, wherein M1 is Sn.

14. The nonaqueous electrolyte battery according to claim 1, wherein M2 is V.

15. The nonaqueous electrolyte battery according to claim 1, wherein M2 is Ta.

16. The nonaqueous electrolyte battery according to claim 1, wherein M2 is Bi.

17. A battery pack comprising the nonaqueous electrolyte battery according to claim 1.

18. The battery pack according to claim 17, further comprising:
an energizing external terminal; and
a protective circuit.

19. A battery pack, comprising a plurality of the nonaqueous electrolyte batteries according to claim 1,
wherein the nonaqueous electrolyte batteries are electrically connected in series, in parallel or with a combination of series connection and parallel connection.

* * * * *